United States Patent
Sellner et al.

(10) Patent No.: US 7,683,277 B2
(45) Date of Patent: Mar. 23, 2010

(54) CONNECTING ELEMENT, CONNECTION AND METHOD FOR PRODUCING A CONNECTION BETWEEN SERVICE SWITCHING DEVICES

(75) Inventors: Rudolf Sellner, Hockenheim (DE); Matthias Bitz, St. Leon-Rot (DE)

(73) Assignee: ABB Patent GmbH, Ladenburg (DE)

( * ) Notice: Subject to any disclaimer, the term of this patent is extended or adjusted under 35 U.S.C. 154(b) by 598 days.

(21) Appl. No.: 11/660,857

(22) PCT Filed: Aug. 23, 2005

(86) PCT No.: PCT/EP2005/009091

§ 371 (c)(1),
(2), (4) Date: Feb. 22, 2007

(87) PCT Pub. No.: WO2006/024430

PCT Pub. Date: Mar. 9, 2006

(65) Prior Publication Data

US 2008/0210533 A1   Sep. 4, 2008

(30) Foreign Application Priority Data

Sep. 2, 2004   (DE) .................... 10 2004 042 428

(51) Int. Cl.
*H01H 9/20* (2006.01)

(52) U.S. Cl. .................... 200/293; 200/50.32

(58) Field of Classification Search ..... 200/50.32–50.4, 200/400, 401, 293, 295, 297, 303, 307; 218/2–6, 218/22, 155; 335/202; 361/634, 637, 645; 24/297, 453, 581.11; 403/294, 292, 278, 403/279; 439/570, 533, 529, 59, 60, 492, 439/61, 675, 578, 825, 607, 629, 347, 511, 439/723, 724, 810

See application file for complete search history.

(56) References Cited

U.S. PATENT DOCUMENTS

| | | | | |
|---|---|---|---|---|
| 3,240,889 A | * | 3/1966 | Leland et al. | 335/160 |
| 3,243,558 A | * | 3/1966 | Link et al. | 218/1 |
| 3,510,612 A | * | 5/1970 | Ward | 200/50.33 |
| 4,954,798 A | * | 9/1990 | Kasahara et al. | 335/161 |
| 6,002,579 A | * | 12/1999 | Drexler et al. | 361/605 |
| 6,692,181 B1 | * | 2/2004 | Franz et al. | 403/294 |
| 7,482,546 B2 | * | 1/2009 | Sellner et al. | 200/293 |

FOREIGN PATENT DOCUMENTS

| | | |
|---|---|---|
| DE | 79 00 929 | 1/1979 |
| DE | 83 22 594.3 | 1/1984 |
| EP | 1 109 277 A2 | 6/2001 |

* cited by examiner

*Primary Examiner*—Michael A Friedhofer
(74) *Attorney, Agent, or Firm*—Buchanan Ingersoll & Rooney PC

(57) ABSTRACT

The invention relates to a connector element for two installation breakers, adjacently attached with the broad faces thereof in contact, in particular, power breakers or residual current breakers, the housings of which are each formed from two dished housing pieces. The connector element comprises an approximately cylindrical base body with a first external diameter on the front side of which two radially-sprung, axially projecting first and second expanding arms are moulded. The external contours of the spreader arms lie on a cylindrical outer surface, the external diameter of which is smaller than the first external diameter of the base body. The free ends thereof comprise radially projecting lugs on opposed external lines, which, in the assembly state, clip behind recesses on the housings, for connection by means of the connector element, of adjacent installation breakers. A sprung spreader element is mounted between a first and second spreader arm such that the spreader element supports the sprung spreading of the spreader arms, and which impedes the sprung contact of the first and second spreader arms with each other.

18 Claims, 6 Drawing Sheets

Figure 1:
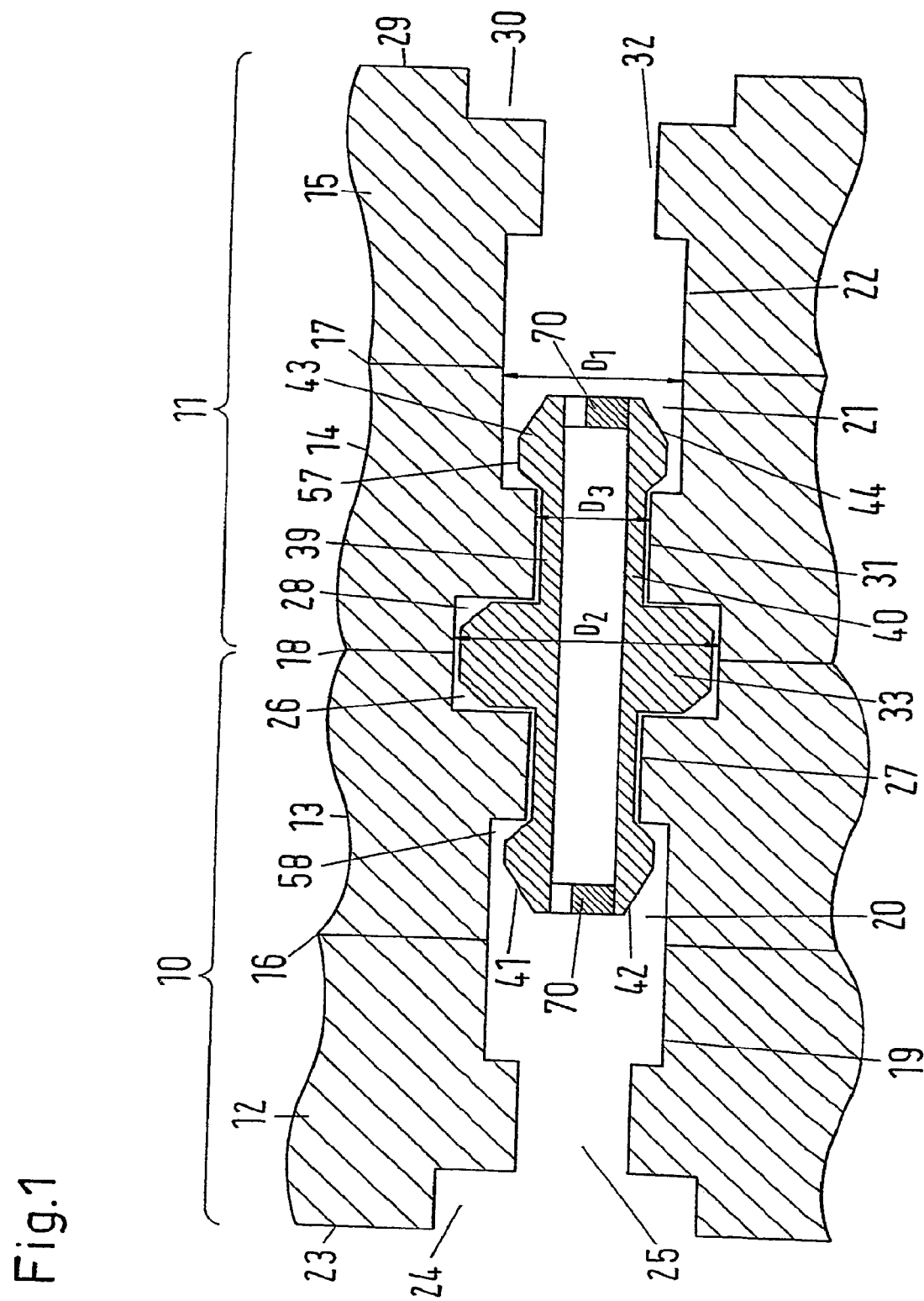

CONNECTING ELEMENT, CONNECTION AND METHOD FOR PRODUCING A CONNECTION BETWEEN SERVICE SWITCHING DEVICES

The invention relates to a connecting element for connecting service switching devices in accordance with the precharacterizing clause of claim 1, to a connection between service switching devices in accordance with the precharacterizing clause of claim 15 and to a method for connecting service switching devices in accordance with the precharacterizing clause of claim 17.

A single-pole electrical line circuit breaker or residual-current circuit breaker has a housing in the form of a shell, the front edges of the shell walls being laid against one another. The two shells are fixed in relation to one another, for example, by means of riveted joints. Such single-pole service switching devices can be assembled to form multipole service switching devices. It is known to rivet the individual poles to one another. Riveted joints are technically complex, however.

EP 1 109 277 A2 describes, as an alternative to the riveted joint, the connection of two service switching devices by means of a connecting element which has an approximately cylindrical basic body having a first outer diameter, in each case two axially protruding first and second spreading arms which spring open radially being integrally formed on the front sides of said basic body. The outer contours of the spreading arms rest on a cylindrical outer surface, whose outer diameter is smaller than the first outer diameter of the basic body. The free ends of the spreading arms have radially protruding tabs, to be precise on opposite surface lines. In the fitted state, the tabs latch in behind recesses on the housings, which are to be connected to the connecting element, of the adjacent service switching devices.

However, a connection between two service switching devices using a connecting element as described in EP 1 109 277 A2 has mechanical play. In addition, undesirable unlatching of the connection may result if the spreading arms spring towards one another and therefore slide through beneath the recesses again.

In order to prevent this, in the case of the connection as described in EP 1 109 277 A2, it is necessary to insert a pin which prevents the spreading arms from springing towards one another. Owing to the fact that it is necessary to insert this pin, the connection in accordance with EP 1 109 277 A2 is complex, however.

It is therefore the object of the invention to provide a connecting element of the generic type, which can be used to markedly simplify the connection process of two service switching devices which are to be connected to one another and make it possible to produce the connection in a more reliable manner.

The object of the invention is furthermore to provide a simple and reliable connection between two service switching devices and to describe a method for producing this connection.

The object is achieved according to the invention by a connecting element having the characterizing features of claim 1. As regards a connection according to the invention, the object is achieved by the characterizing features of claim 15. As regards the method for producing a connection between two service switching devices, the object is achieved by the characterizing features of claim 17.

According to the invention, in each case one sprung spreading element is therefore fitted between a first and second spreading arm such that the spreading element assists in spreading the spreading arms apart such that they spring open and makes it more difficult for the first and second spreading arms to spring towards one another. The sprung spreading element is in this case advantageously fitted between the free ends of the spreading arms.

In one further, very advantageous refinement of the invention, the spreading element is a compression spring, whose points of articulation are located on mutually facing faces of the spreading arms.

The advantage of a connecting element according to the invention consists in the fact that the connection can be produced in a very reliable and dimensionally stable manner. The spreading element, which according to the invention is fitted between the spreading arms, increases the spreading force of the two spreading arms once they have latched in behind the recesses on the housings to be connected. In addition, the spreading element prevents the spreading arms from springing towards one another unintentionally. It is therefore not necessary when using a connecting element according to the invention to insert any additional pins in order to avoid such springing.

One further advantage of the invention consists in the fact that, when using a connecting element according to the invention, the surface lines and the tabs engaging behind the recesses may be matched to inner contours in the cylindrical accommodating depressions owing to the additional force of pressure of the spreading element on the two sprung spreading arms.

One very advantageous possible refinement of the invention consists in the fact that the compression spring is an elongate part bent in the form of an S. This may be, for example, a sprung strip bent in the form of an S. The sprung spreading element can advantageously in this case be integrally formed on the spreading arms. It can then consist of the same material as the spreading arms themselves. It is very advantageous if the spreading element together with the connecting element consists of plastic and is produced in one piece in an injection-molding process.

Also advantageous is a possible refinement of the connecting element, in the case of which the spreading arms, in the fitted state, can be pushed towards one another at their free end using a special tool. This is because in this case, in order to detach the connection, it is possible for the spreading arms to be pushed together using the special tool through the opening into which the connecting element has been latched, from that side of the service switching device which is opposite the connecting element, with the result that the radially protruding tabs of the connecting element unlatch from the recesses and the connecting element can be withdrawn in a simple manner from the through-hole.

In order to compensate for tolerances in the housings, the transition face between the basic body and the spreading arms and the transition face between the spreading arms and the tabs are each conical. This means that the recess bears against the tabs even in the case of an unfavorable tolerance position.

One further advantage of a connecting element according to the invention also consists in the fact that the selection of materials and the amount of structural design play with respect to the design of the spreading arms are very great. It is no longer necessary, as in the case of the solution in EP 1 109 177 A2, to take care to ensure that the spreading arms themselves are designed to be relatively rigid. The spreading arms themselves can be designed to be relatively flexible since the sprung spreading element produces the necessary force of pressure for holding the connecting element in the latching position.

It is thus possible for the sprung spreading element to consist of the same material as the spreading arms. This material can advantageously be plastic. The connecting element can then be produced, for example, together with the sprung spreading element in an injection-molding process. This provides a very cost-effective manufacturing option for the connecting elements.

Further advantageous refinements and improvements of the invention are described in the further dependent claims.

Figure 2:
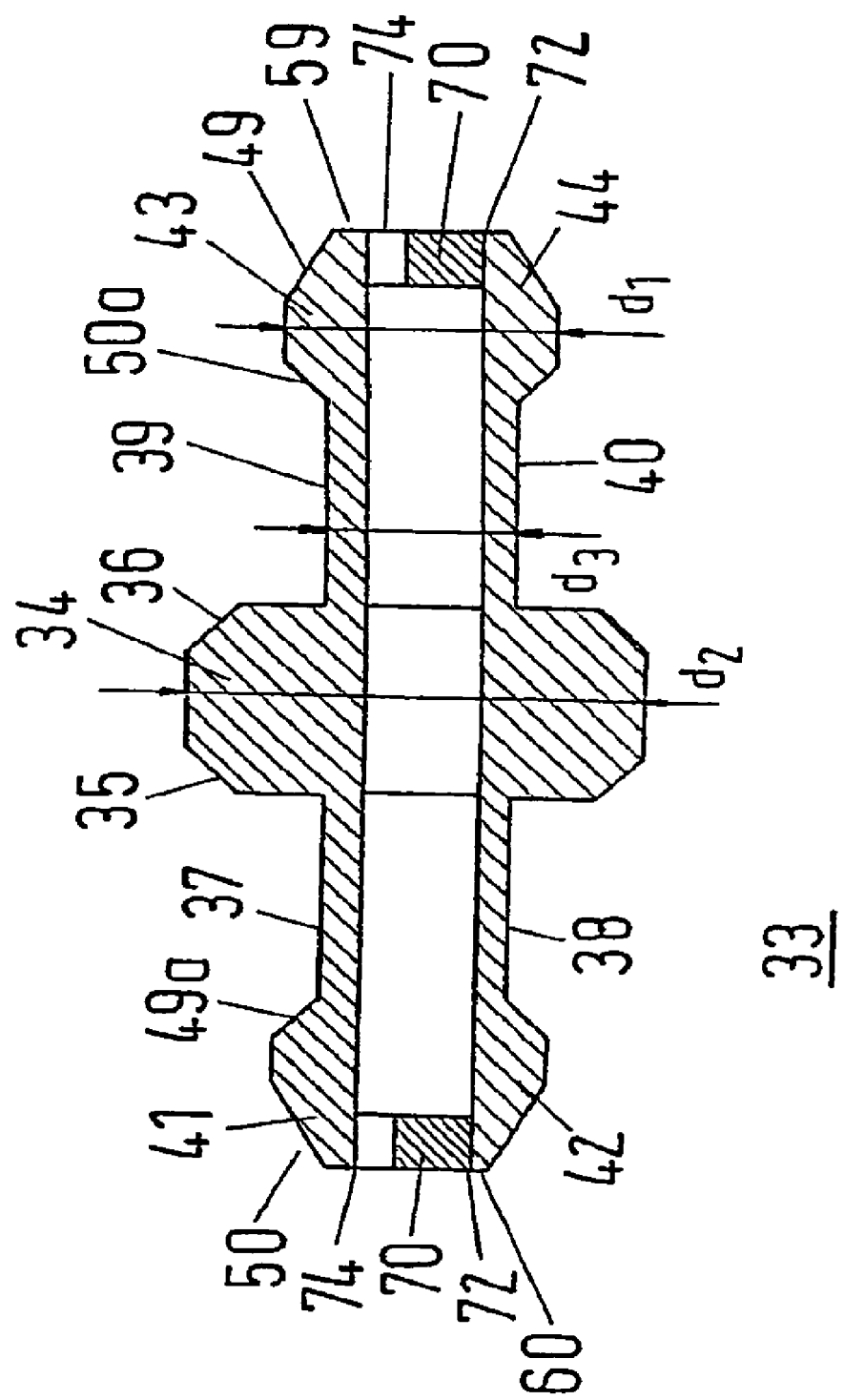
Figure 3:
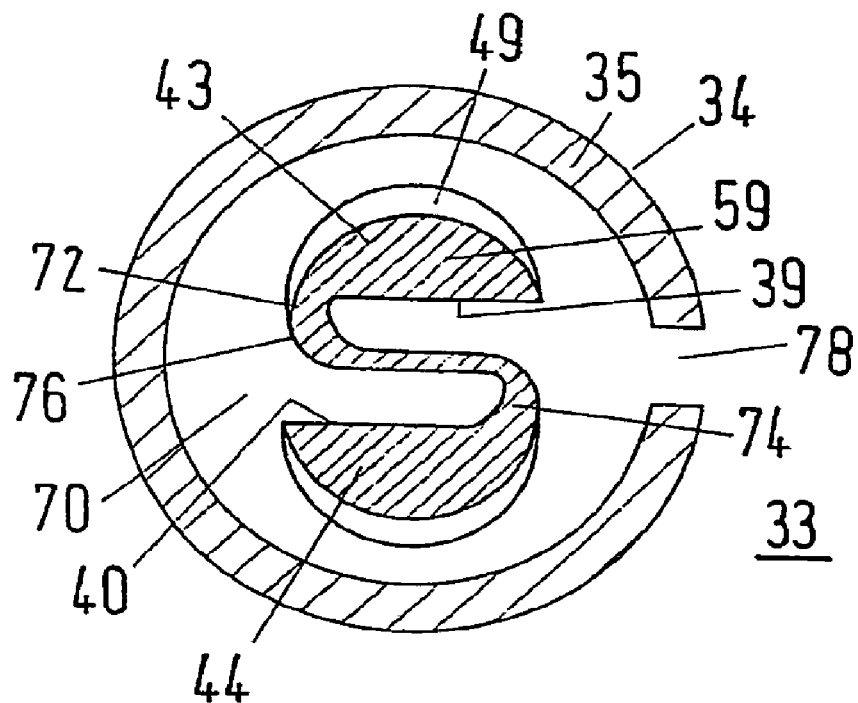
Figure 4:
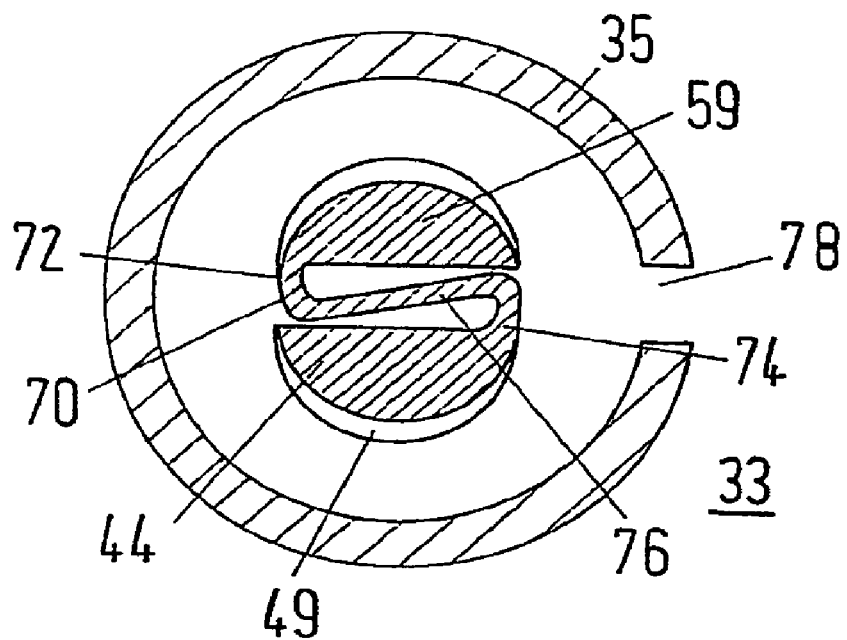
Figure 5:
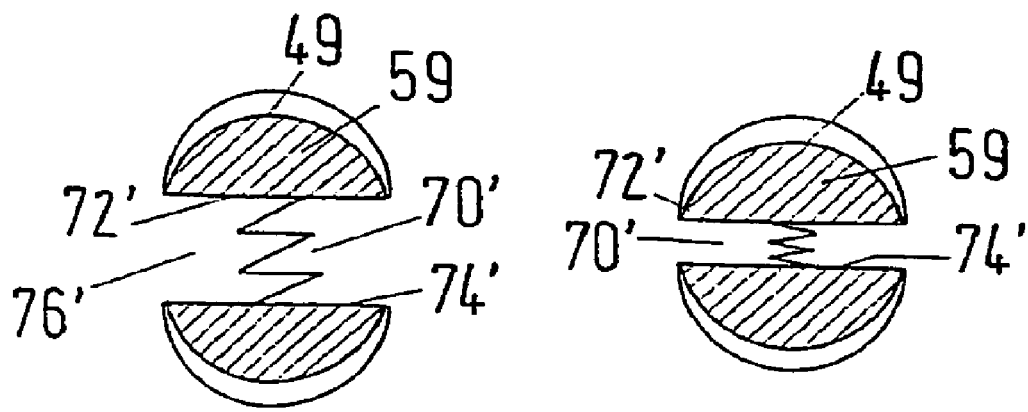
Figure 6:
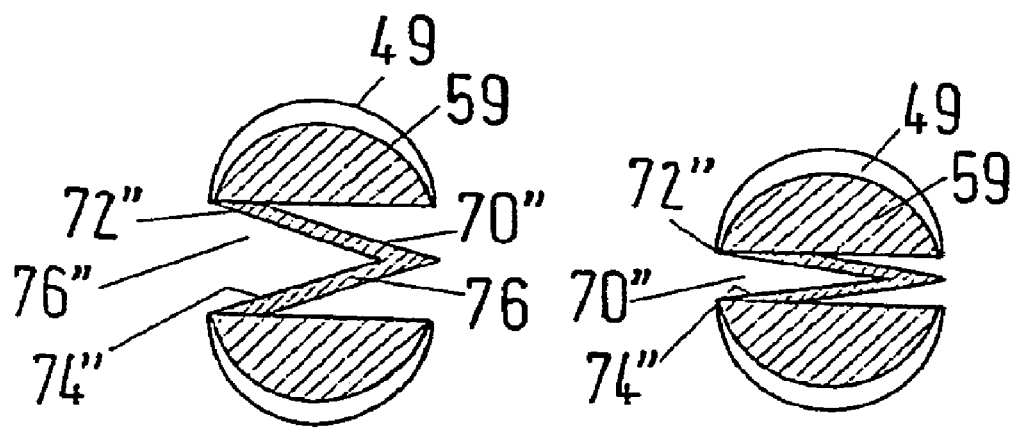
Figure 7:
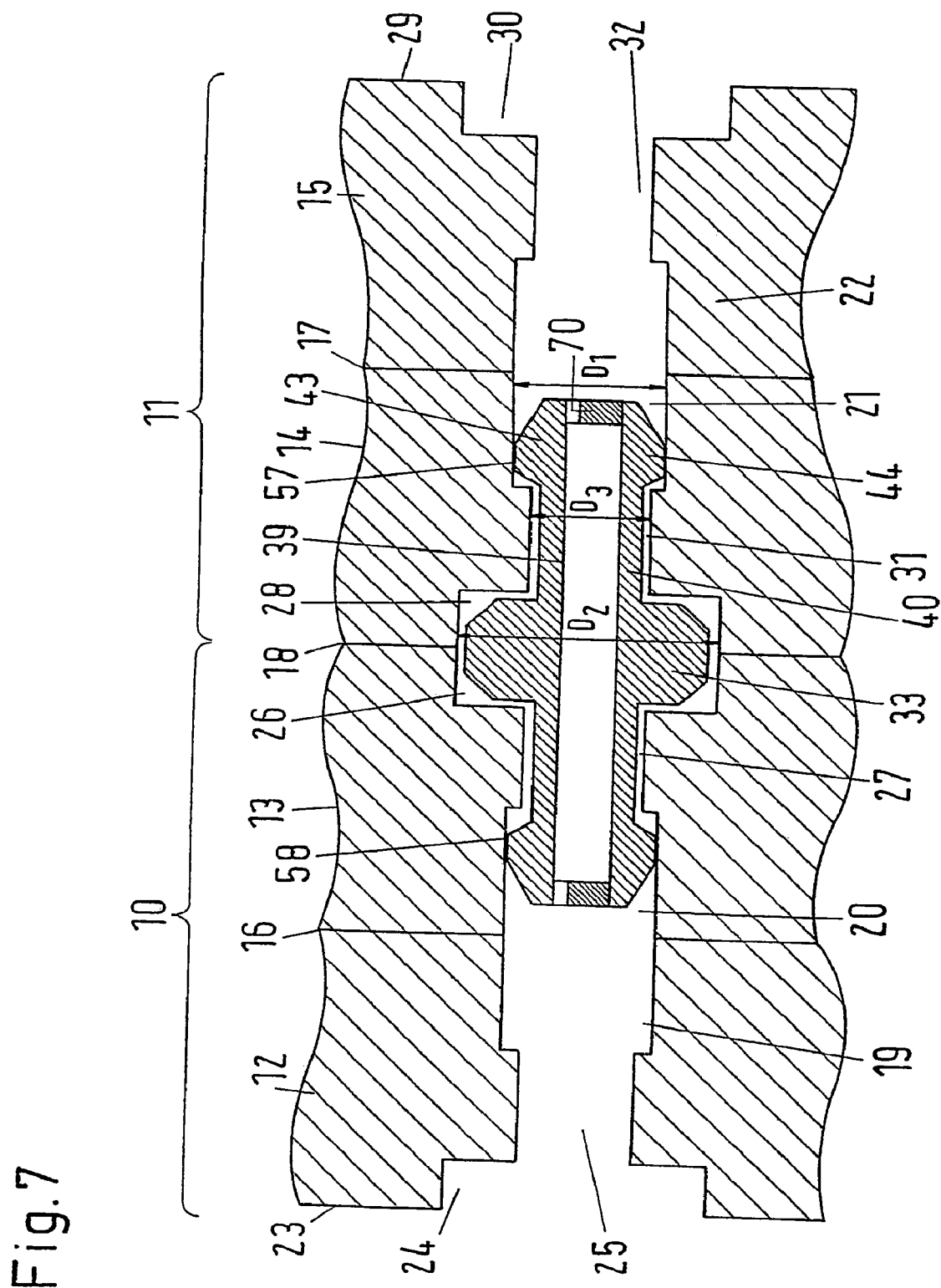
Figure 8:
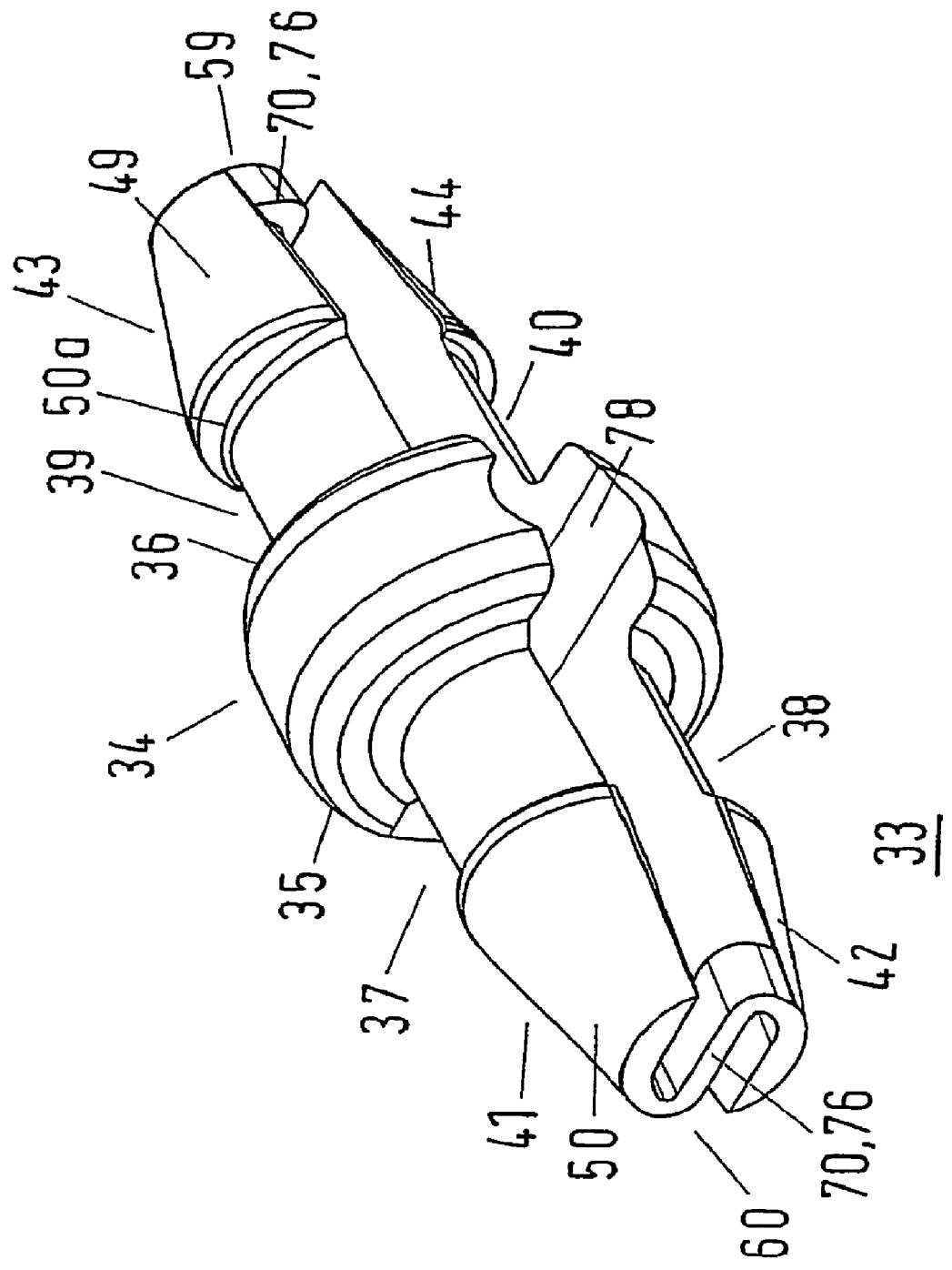

The invention and further advantageous refinements and improvements of the invention will be explained and described in more detail with reference to the drawings, in which three exemplary embodiments of the invention are illustrated and in which:

FIG. 1 shows a partially sectional view of two service switching devices having a connecting element, only that region which is adjacent to the connecting element being illustrated, FIG. 2 shows a longitudinal sectional view through the connecting element according to the invention, FIG. 3 shows a plan view of the free end of the spreading arms of the connecting element shown in FIG. 2, in the unstressed state, FIG. 4 shows a plan view of the free end of the spreading arms of the connecting element shown in FIG. 2, in the pushed-together state, corresponding to the fitted state, FIG. 5 shows a plan view of the free end of the spreading arms of a further embodiment of a spreading element according to the invention, on the left-hand side in the unstressed state and on the right-hand side in the pushed-together state, FIG. 6 shows a plan view of the free end of the spreading arms of a further variant of a connecting element according to the invention, on the left-hand side in the unstressed state and on the right-hand side in the pushed-together state, in the installed position, FIG. 7 shows a further embodiment of the connection of two switching devices using a connecting element according to the invention, the opening diameter differing from the connection shown in FIG. 1, and FIG. 8 shows an isometric illustration of a connecting element according to the invention.

FIG. 1 shows a sectional view of that region of two adjacent service switching device housings 10 and 11 which is adjacent to the connecting point. Each housing 10, 11 comprises shell-shaped housing parts 12, 13 and 14, 15, the partition line between the housing parts 12 and 13 having the reference numeral 16, and the partition line between the housing parts 14 and 15 having the reference numeral 17. The touching face between the two housings 10, 11 is denoted by 18 and corresponds to in each case one broad side of the two housings 10, 11.

Starting from the partition lines 16, 17, each housing part has a cylindrical first depression 19, 20 or 21, 22, which, in the assembled state when the two housing parts 12, 13 and 14, 15 are placed one on the other, form a cylindrical interior with one another. A depression 24, which is connected to the depression 19 via a through-hole 25, is located on the broad side 23 of the housing part 12. In a similar manner, the broad side of the housing part 13, which forms the touching face 18, has a depression 26, which opens out into this face and is connected to the depression 20 via a through-hole 27.

A depression 30, which is connected to the depression 22 via a through-hole 32, is located on the broad side 29 of the housing part 15. In a similar manner, the broad side of the housing part 14, which likewise forms the touching face 18, has a depression 28, which opens out into this face and is connected to the depression 21 via a through-hole 31.

The depressions 19, 20, 21 and 22, 24 and 30 are aligned with one another in the same way as the through-holes 25, 27, 31, 32.

A connecting element 33, which is illustrated in section in FIG. 2, is inserted into the depressions or through-holes. The connecting element 33 consists of plastic and is produced in an injection-molding process.

The inner diameter of the through-holes 25, 27, 31, 32 is denoted by D3. The inner diameter of the first depressions 21, 22, 19, 20 is denoted by D1. The inner diameter of the second depressions 28, 26, 24, 30 is denoted by D2.

The connecting element 33 has a central cylindrical basic body 34, on whose front sides 35 and 36 sprung spreading arms 37, 38 and 39, 40, which protrude in the axial direction, are fitted in pairs.

The outer parts of the front sides 35 and 36 of the basic body 34 form a conical shape, whose open sides are directed towards one another. The cone angle is in this case slightly less than 180°. It is a very obtuse cone angle.

The outer diameter of the basic body 34 is denoted by d2. It is selected such that it fits into the depressions 26, 28, 30, 24. The cylinder faces surrounding the spreading arms 37, 38 and 39, 40 have an outer diameter d3, which corresponds to the inner diameter of the through-holes 25, 27, 31, 32. In each case tabs 41, 42, 43, 44 are integrally formed on the spreading arms 37, 38 and 39, 40, respectively, said tabs protruding radially in the opposite direction and resting on diametrically opposite surface lines or surface faces.

The tabs 41, 42, 43, 44 have outer tab faces 49, 50, which form a conical shape or the shape of a truncated cone, the truncated cones tapering towards the free ends 59, 60 of the spreading arms 37, 38, 39, 40.

The tabs 41, 42, 43, 44 likewise have a conical shape on their inner tab faces 49a, 50a, which lie opposite the front faces 35, 36, said conical shape being open towards the free end and likewise having a similar opening angle to the front faces 35 and 36.

The cone faces 35, 36, 49a, 50a, 49, 50 serve the purpose of compensating for tolerances in the longitudinal extent of the holes 25, 27, 31, 32 and tolerances in the diameters and of making it easier to insert the connecting elements into the openings in automated fashion.

A sprung spreading element 70 is integrally formed at the free end 59 of the two spreading arms 39, 40 between them. A sprung spreading element 70 is likewise integrally formed at the free ends 60 of the spreading arms 37, 38 between the two spreading arms 37, 38. The sprung spreading element 70 acts as a compression spring which pushes the spreading arms 39, 40 or 37, 38 away from one another.

The exemplary embodiment in FIGS. 2 and 8 shows an elongate part which is bent in the form of an S and is in the form of a strip, and which can also be referred to as a flat spiral spring 76 bent in the form of an S.

FIG. 8 shows an isometric illustration of a connecting element 33 according to the invention, as is illustrated in FIG. 2 in longitudinal section. Identical elements or parts as have already been described in FIG. 1 or 2 have the same reference numerals. The connecting body 33 has an axially running slot 78. As a result, the basic body 34 can also be pushed together radially in a sprung manner when the connecting element 33 is inserted into the corresponding depressions, which further increases the ability of the connecting element 33 to have its contours matched.

In the case of efficient fitting with the aid of machines, the connecting elements are often brought into the feed container of the fitting machine by means of feeder vibration. Owing to the S shape of the flat spiral spring 76, in this case the connecting elements are prevented from hooking underneath one another, which improves the efficient fitting.

FIG. 3 shows a plan view of the free ends 59, 60 of the connecting element 33, in the unstressed state. Identical components or parts are already described in FIG. 1, 2 or 8 and have the same reference numerals in FIG. 3. The face surrounding the tab face 49 of the radially protruding tabs 43 and 44 has an oval cross section. The points of articulation 72, 74 of the flat spiral spring 76 bent in the form of an S are integrally formed on the spreading arms 39 and 40.

FIG. 4 shows the connecting element 33 having the spreading element 70 shown in FIG. 3, but, in FIG. 4, the free ends of the spreading arms 39 and 40 are pushed-together. This pushed-together position shown in FIG. 4 corresponds to the position in which the connecting element 33 is passed through the through-hole 31 in the housing half 14 of the service device 11 (see FIG. 1). In the pushed-together state in FIG. 4, the face surrounding the protruding tabs 43, 44 rests on an outer surface having a circular cross section, with the result that the protruding tabs 43, 44 can therefore easily be passed through the through-hole 31, which likewise has a circular cross section.

As can be seen in FIG. 1, once the protruding tabs 43, 44 have been passed through the through-hole 31 and the inner tab face 50a, also referred to as the latching face, has been latched in behind the recess 57, the spreading arms 39 and 40 bear flat against the inner contour of the through-hole 31. Owing to the force of pressure of the sprung spreading element 70, the spreading arms 39, 40 are pushed against the inner contour of the through-hole 31 in a form-fitting manner. The outer diameter of the cylinder face surrounding the spreading arms 39, 40 is approximately equal to the inner diameter of the through-hole 31.

For fitting purposes, the two housing parts 14 and 15 or 12 and 13 are therefore initially assembled to form in each case one service device 11 or 10. Then, the connecting element with the spreading arms 39, 40 is inserted through the through-hole 31. As soon as the spreading arms have passed through the through-hole 31, they engage with the latching face 50a behind the recess 57 adjacent to the through-opening.

In order to fix the other service device 10, it is plugged with the through-hole 27 over the tabs 41, 42 until the tabs 41, 42 engage with their latching face 49a behind the recess 58 of the through-hole 27.

FIGS. 1 and 7 merely illustrate a connecting element. In order to connect two adjacent service devices, for example two line circuit breakers to form a two-pole line circuit breaker, more than one, typically three or four, connecting elements would then be necessary.

A three- or four-pole line circuit breaker could also be produced from the two-pole line circuit breaker having the two poles 10, 11. For this purpose, a further connecting element 33a (not illustrated here, but having the same design as the connecting element 33; identical parts are denoted by the same reference numerals, supplemented by the letter a) with the spreading arms 37a, 38a is passed through the opening 32 until the tabs 41a, 42a latch into the depression 22. Then, a further switching device is latched via the latching arms 39a and 40a.

In contrast to a riveted joint, such a spreading connection is simple. In contrast to the spreading connection described in EP 1 109 277 A2, the connection quality with the spreading element according to the invention is markedly greater, and it is simple to produce a reliable spreading connection. This is because, owing to the sprung spreading element 70, the spreading arms of the connecting element are each pushed from the inside outwards against the inner contour of the through-hole or against the recesses by the force of pressure of the spring. It is therefore no longer possible for the spreading arms to spring towards one another and therefore for the spreading connection to be detached unintentionally.

If the connection of the two switching devices 11 and 10 by means of connecting elements as shown in FIG. 1 is intended to be detached again, this can take place as follows. A special tool is inserted through the opening 32 and therefore the two free ends of the spreading arms 39, 40 of the connecting element 33 are pushed together until the protruding tabs 43, 44 unlatch from the recess 57 again. The connecting element can therefore slide out through the through-hole 31.

FIG. 7 shows a further variant of the possible connection. The connection shown in FIG. 7 differs from that shown in FIG. 1 by the inner diameter of the first depressions 21 and the through-hole 31. In FIG. 7, the inner diameter of the through-hole 31 is greater than the outer diameter of the cylinder face surrounding the spreading arms 39, 40. For this purpose, the inner diameter of the first depression 21 is slightly smaller than the outer diameter of the cone base diameter d1 of the truncated cone outer surface surrounding the tab faces 49 of the protruding tabs 43, 44. As a result, once the spreading arms have been inserted through the through-hole 31 and the latching face 50a has latched with the undercut 57, the tab face 49 with the base of the cone of the truncated cone face surrounding it is pushed against the inner diameter of the first depression 21 owing to the force of pressure of the sprung spreading element 70. This is a further possibility for ensuring a play-free, fixed spreading connection. Otherwise, the components and component parts shown in FIG. 7 have the same reference numerals as in FIG. 1.

FIG. 5 shows a schematic illustration of a further possible embodiment for a sprung spreading element 70'. FIG. 5 shows a plan view of the free ends of the spreading arms of a connecting element according to the invention, the shown component parts having the same reference numerals as in the preceding figures, supplemented by an apostrophe. In this case, the sprung spreading element 70' is in the form of a cylinder compression spring 76'. The left-hand part of the picture in FIG. 5 shows the unstressed state, and the right-hand part of FIG. 5 shows the pushed-together state.

FIG. 6 shows a further possible embodiment of a sprung spreading element 70" according to the invention. In FIG. 6, too, identical component parts or elements are denoted by the same reference numerals as in the preceding figures, supplemented by a double apostrophe. FIG. 6, like FIG. 5, shows a plan view of the free ends of the spreading arms of a connecting element according to the invention. The sprung spreading element 70" is in this case in the form of a twin-armed articulated spring 76". The twin-armed articulated spring 76" comprises two sprung bars which are joined together at their free ends. The left-hand part of FIG. 6 again shows the unstressed state, and the right-hand part shows the pushed-together state.

Other forms for the specific design of a sprung spreading element for realizing a connecting element according to the invention are of course also conceivable. These should all be included in the invention. Fitting the sprung spreading element to the free end of the spreading arms has an advantage in that the force exerted by the compression spring is at its greatest owing to the lever arm ratio. However, it may also be necessary for design reasons not to fit the sprung spreading element to the free end of the spreading arms but at another point. The sprung spreading element would then have to have a greater spring constant. Otherwise, however, the essential concept of the invention would also be realized with such a sprung spreading element fitted at another point between the two spreading arms.

Spreading elements according to the invention stabilize the position and the dimensions during production of the connecting elements irrespective of the specifically selected shape of the spreading element.

The invention claimed is:

1. A connecting element for service switching devices, which are arranged next to one another in a row and bear against one another with their broad sides, whose housings are formed in each case from two shell-like housing parts, the connecting element having an approximately cylindrical basic body having a first outer diameter, on whose front sides in each case two axially protruding first and second spreading arms which spring open radially are integrally formed, whose outer contours rest on a cylindrical outer surface, whose outer diameter is smaller than the first outer diameter of the basic body, and whose free ends have radially protruding tabs on opposite surface lines, which tabs, in the fitted state, latch in behind recesses on the housings, which are to be connected to the connecting element, of the adjacent service switching devices, wherein each case one sprung spreading element is fitted between a first and second spreading arm such that the spreading element assists in spreading the spreading arms apart such that they spring open and makes it more difficult for the first and second spreading arms to spring towards one another.

2. The connecting element as claimed in claim 1, wherein the spreading element is fitted between the free ends of the spreading arms.

3. The connecting element as claimed in claim 2, wherein the spreading element is a compression spring, whose points of articulation are located on mutually facing faces of the spreading arms.

4. The connecting element as claimed in claim 3, wherein the compression spring is an elongate part bent in the form of an S.

5. The connecting element as claimed in claim 1, wherein the sprung spreading element is integrally formed on the spreading arms.

6. The connecting element as claimed in claim 5, wherein the sprung spreading element consists of the same material as the spreading arms.

7. A connecting element as claimed in claim 1, which is manufactured using the injection-molding technique.

8. The connecting element as claimed in claim 7, wherein the connecting element is manufactured together with the spreading element in an injection-molding process.

9. A connecting element as claimed in claim 1, which is manufactured from plastic.

10. The connecting element as claimed in claim 1, wherein the spreading arms, in the fitted state, can be pushed towards one another at their free end using a special tool.

11. The connecting element as claimed in claim 1, wherein the free ends of the tabs are conically tapered.

12. The connecting element as claimed in claim 1, wherein the front faces of the basic body are in the form of a truncated cone, the cone angles being open towards one another.

13. The connecting element as claimed in claim 12, wherein the cone base diameter is larger than the outer diameter of the cylindrical outer surface and smaller than the first outer diameter of the cylindrical basic body.

14. The connecting element as claimed in claim 1, wherein the tab faces opposite the front faces have a conical shape, whose cone angle is open in the opposite direction.

15. A connection for service switching devices, whose housings are formed from in each case two shell-like housing parts, having a connecting element as claimed in claim 1, each housing part, starting from a partition line between two housing parts, having a cylindrical, first depression having a first inner diameter, which corresponds to the cone base diameter of the connecting element, and, starting from the housing broad side, having a cylindrical, second depression having a second inner diameter, which corresponds to the outer diameter of the cylindrical basic body, which depressions are connected to one another by a cylindrical through-hole, wherein the connecting element engages with its tab faces behind the recesses, which are produced at the transition between the first cylindrical depressions in the housing parts to be connected of the service switching devices and the cylindrical through-holes, and the spreading element pushes the sprung spreading arms against the inner contour of the first cylindrical depressions and/or the through-holes.

16. The connection as claimed in claim 15, wherein the faces surrounding the tab faces of the radially protruding tabs, in the uninstalled state, rest on outer surfaces of oval truncated cones and, in the installed state, rest on outer surfaces of slightly circular truncated cones.

17. A method for producing a connection between service switching devices as claimed in claim 15 having a connecting element wherein each case one connecting element is latched into openings arranged on one broad side of a first service switching device with recesses, and in that a second service switching device is pushed against the first service switching device at right angles to the broad side, each connecting element engaging in openings with recesses on the other broad side of the second service switching device.

18. The method as claimed in claim 17, wherein, in order to detach the connection, a special tool is used to engage through the opening into which the connecting element was latched, from that side of the service switching device which is opposite the connecting element and to push the spreading arms of the connecting element together until the radially protruding tabs of the connecting element unlatch from the recesses and the connecting element can be withdrawn from the through-hole.

* * * * *